US005390214A

United States Patent [19]

Hopkins et al.

[11] Patent Number: 5,390,214

[45] Date of Patent: * Feb. 14, 1995

[54] DIGITAL AUDIO BROADCASTING SYSTEM

[76] Inventors: John W. Hopkins, 8240 Mercer Dr., Norfolk, Va. 23505; Anthony J. Impastato, 280 Pritchard Rd., Virginia Beach, Va. 23452

[ * ] Notice: The portion of the term of this patent subsequent to Jan. 12, 2000 has been disclaimed.

[21] Appl. No.: 1,786

[22] Filed: Jan. 8, 1993

Related U.S. Application Data

[63] Continuation of Ser. No. 508,806, Apr. 12, 1990, Pat. No. 5,179,576.

[51] Int. Cl.$^6$ .......... H04L 27/00

[52] U.S. Cl. .......... 375/37; 375/122; 455/42

[58] Field of Search .......... 375/37, 44, 45, 50, 375/122; 455/42, 49.1, 20, 21; 381/31

[56] References Cited

U.S. PATENT DOCUMENTS 4,021,737 5/1977 Trask .......... 455/42
4,124,773 11/1978 Elkins .......... 379/101
4,630,285 12/1986 Dyer et al. .......... 375/37
5,038,402 8/1991 Robbins .......... 381/3
5,179,576 1/1993 Hopkins et al. .......... 375/37

*Primary Examiner*—Stephen Chin
*Assistant Examiner*—T. Ghebretinsae
*Attorney, Agent, or Firm*—Stephen E. Clark

[57] ABSTRACT

Broadcasting system digitizes audio input signals before RF modulating and transmitting over airwaves to one or more remote receiving stations. Receiving station recovers the digitized signal by demodulating and exponentially expanding the received RF signal. Recovered digital signal is subsequently frequency modulated and sent, via an electrically conductive cable, to an FM radio, over which the original audio input signals are faithfully reproduced. A time switch in series with the RF receiver and the FM modulator is capable of temporarily disabling modulated transmissions to radio through the electrically conductive cable. Relay stations, (either land-based or satellite), allow for transmission beyond the range (i.e. "line-of-sight") of common FM radio transmissions.

5 Claims, 9 Drawing Sheets

DIGITAL AUDIO BROADCASTING SYSTEM

This application is a continuation of application Ser. No. 04/508,806, filed Apr. 12, 1990, now U.S. Pat. No. 5,179,576.

BACKGROUND OF THE INVENTION

1. Field of Invention

The present invention relates to radio communication equipment. In particular, the present invention relates to a system for converting voice and music signals into their digital equivalents, transmitting this digital information over air, receiving the digital signal, translating the digital information into FM (frequency modulation) format, and re-transmitting the information as an FM radio signal.

2. Description of the Related Art

Typical prior AM (amplitude modulation) and FM (frequency modulation) broadcast systems generally comprise a main RF (radio frequency) transmitter with either local facilities or remote studios which control inputs to a transmitter. By using an audio mixing apparatus, an operator typically selectively combines the desired analog inputs from turntables, microphones, tape decks, or disk players. All these analog signals are subsequently used to modulate the RF carrier of an AM or FM transmitter.

FM is a method by which the frequency of the carrier wave is made to change in accordance with an audio voltage. During AM, the carrier frequency remains constant, but its amplitude is made to change in accordance with the audio signal. The essential difference between FM and AM is that in the AM modulation period the amplitude of the RF carrier rises and falls in accordance with an impressed audio frequency signal; whereas in FM, during the modulation period, the frequency increases and decreases as the audio frequency changes, but the amplitude of the RF carrier remains constant. Both AM and FM are inherently analog modulation systems.

There are numerous prior methods to modulate AM and FM transmitters. But for AM or commercial FM, all prior systems use an analog signal input to modulate and transmit.

Every radio transmitter requires a certain amount of the radio spectrum for its operation. The electromagnetic spectrum has been broken down into "channels". The standard AM broadcast band extends from 535 kc to 1,605 kc. Accordingly, there are one hundred and seven AM broadcast band channels, each occupying 10 kc of bandwidth. The commercial FM broadcasting band extends from 88 mc to 108 mc on the electromagnetic spectrum. One hundred FM broadcast band channels each occupy 200 kc of bandwidth.

Many (AM and FM) channel assignments are duplicated across the Country. Any overlapping of shared channels within a common broadcasting area produces interference. Also, any deviation from assigned operating frequency produces interference to adjacent channels.

A transmitter modulates an RF carrier frequency. The modulated RF carrier frequency is subsequently transmitted over air from an antenna. The transmitted (AM or FM) signal is received by a receiver, which then converts the signal back to the original (analog) form which had been supplied to the audio mixer.

Although the broadcast area of AM is greater than FM, AM is inherently noisier than FM due to the narrower bandwidth of any given AM channel and the inherent susceptibility of the receiver to amplify modulated signals that are produced by electrical discharges such as lightning and high power transmission lines.

Although FM typically offers a clearer signal upon reception than does AM, FM requires a wider bandwidth and, accordingly, occupies more of the electromagnetic spectrum per channel.

Noise can also be introduced by the equipment itself (i.e. the RF amplifiers, the mixers, etc.), by background noise from the microphone, or by other RF generators.

The broadcast range of FM is inherently limited to local area coverage. FM signals tend to fade when there is a physical barrier between the transmitting antenna and the FM receiver.

Although both AM and FM can be relayed, neither can be relayed without introducing noise to the signal.

SUMMARY OF THE INVENTION

Digitally transmitted signals offer an inhanced service over AM and FM (i.e. over analog modulated transmissions). It is a primary object of the present invention to provide a radio transmission and receiving system wherein analog input signals, (such as voice and music), are converted to their digital equivalents; digitally modulated and transmitted over air; received; and subsequently reconverted back to the original analog (i.e. voice and music) form.

It is another object of the present invention to provide a system of the character described wherein the digitally modulated RF signals are in the range of 108 MHz to 1 GHz of the electromagnetic spectrum.

It is another object of the present invention to provide a system of the character described wherein the broadcast signals are less susceptible to noise and other interference than comparable AM or FM broadcasts of the same analog input.

It is another object of the present invention to provide a system of the character described wherein the broadcast signals may be relayed without introducing any human-perceptible noise in the audio output of the system.

It is another object of the present invention to provide a system of the character described in which the multiple digitally modulated signals occupy less electromagnetic spectrum bandwidth than comparable multiple FM broadcasts of the same analog input.

It is another object of the present invention to provide a system of the character described having a digital-to-FM converter, so that the digitally modulated information may ultimately be received and played by an FM radio.

It is another object of the present invention to provide a system of the character described having an FM modulator-modifying element, (such as a timer switch), which may temporarily interrupt the conversion for an FM radio.

It is another object of the present invention to provide a system of the character described in which audio signals (including voice and music) originating outside of (i.e., at a greater distance than) the common FM transmission-to-reception radius, may be electronically transmitted over air waves, reproduced and played back over an FM radio.

It is another object of the present invention to provide a system of the character described in which the described transmission is relayed by either orbiting satellites or by land-based relay stations, or by a combination thereof.

Further objects and advantages of the present invention will become apparent from a consideration of the drawings and ensuing description thereof.

DESCRIPTION OF THE PREFERRED EMBODIMENT

Figure 1:
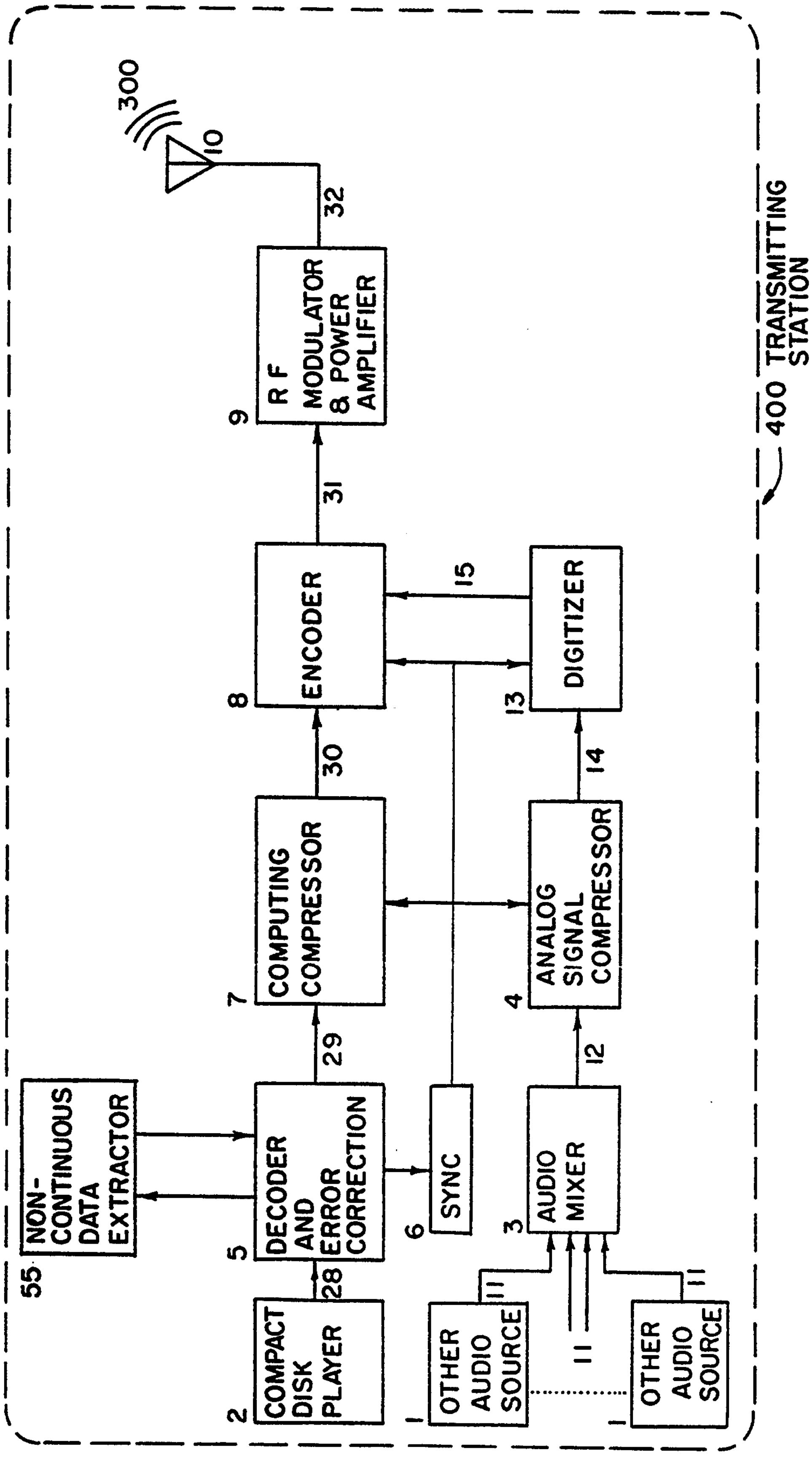
FIG. 1 is a block diagram of the transmitting station of the present invention.

The preferred embodiment of the present invention is a broadcasting system in which analog audio input signals are digitally modulated, transmitted, then subsequently received, and ultimately reproduced in analog form and played over an FM radio. A block diagram of the transmitting station of the preferred embodiment of the invention is shown in FIG. 1.

Transmitting Station (400)

One or more analog audio sources (1) are supplied to an audio mixer (3). The audio source (1) may be, for example, from a phonograph record turntable, from an audio tape, or from a microphone—or any combination of such sources.

The analog audio source (1) is in electrical communication with the audio mixer (3), such that the analog signal (11) output from the analog audio source (1) is input into the audio mixer (3).

The audio mixer (3) combines the various analog audio output signal(s) (11) from the audio source (1) into a single mixed audio analog output signal (12). The audio mixer (3) may be manually operated so as to selectively vary the relative influence of the respective analog audio signal(s) (11) on the mixed audio analog output signal (12) from the audio mixer.

The audio mixer (3) is in electrical communication with an analog signal compressor (4), such that the mixed analog output signal (12) from the audio mixer (3) is also the input to the analog signal compressor (4). Because a 16 bit data word and a sampling rate of 44.1 kHz and 20% overhead for error detection/correction is used in the preferred embodiment of the invention, a two channel (stereo) signal requires a transfer rate of approximately 1.7 MBit per second. In order to lower the overall data transmission rate and corresponding bandwidth, an analog signal compressor (4) is employed to compress the amplitude of the signal (12) before digitizing.

Because the human ear is basically a logarithmic audio receiver, when the audio level is very soft, the human ear can easily perceive noise and very subtle changes in the amplitude of the sound. However, when the music becomes loud, the human ear loses much of its sensitivity to changes in amplitude. Therefore, the number of required data bits transmitted is reduced by passing the audio signal (12) through a logarithmic or exponentially responding circuit which compresses the high (louder) levels of audio before digitizing. This technique reduces the dynamic range required of the digital portion of the system and proportionally decreases the number of data bits in each transmitted word.

Fewer transmitted data bits results in lower data transfer rates and a proportionally smaller required RF bandwidth. [At the receiving station (200) of the system, an analog expander (21) passes the recovered audio signal through a matching antilog or inverse exponential amplifier which restores the linearity to the signal. (See "*Receiving Station (200)*", below.)] A result of this compression is a loss of resolution at higher (louder) audio levels; however, the nonlinear amplitude response of the human ear makes this loss of resolution nearly imperceptible. This compression technique allows for a reduction in the required number of data bits per word without significant degradation of aduio quality, with a proportional decrease in required RF bandwidth.

The analog signal compressor (4) is in electrical communication with a digitizer (13), such that the compressed analog signal (14) output from the analog signal compressor (4) is also the input to the digitizer (13).

The transmission of audio without degradation of quality by present day standards (i.e. compact disk quality), requires a dynamic range after digitizing of 93 dB, a frequency response of 20–20,000 Hz (+0.4/−0.2 dB) and a harmonic distortion of 0.01%. In order to obtain this dynamic range and distortion, the compressed audio signal (14) is quantized to 16 (or 14) binary bits in the digitizer (13). To avoid aliasing of the recovered audio signal in the receiver/converter (200), the minimum sampling rate is dictated by the Nyquist criterion, and is twice the maximum desired frequency response, or 40,000 samples per second.

In the preferred embodiment of the invention, the compact disk encoding standard, (namely: 16 bit digital resolution, a minimum sampling rate of 44.1 KHz, and a 20% data overhead for cross interleaved Reed-Solomon Code (CIRC) error detection and correction), is adopted.

The compressed digital signal (15) output from the digitizer (13) passes to an encoder circuit (8) which encodes the digital signal (30) in such a way as to allow for correction of lost or inaccurate data at the receiving station (200). The encoded data (31) is then sent to an RF modulator and power amplifier (9) which modulates the data at an RF frequency. The modulated RF signal (32) is sent from the RF modulator and power amplifier (9) to a transmitter antenna (10) from which the modulated RF signal (300) is sent over the air to one or more receiving stations, (generally indicated as (200) in the drawings).

In addition to the analog audio signal sources (1), (such as phonographs, audio tapes, and microphones, etc.), the preferred embodiment of the present invention is adapted to accept digital signals directly from a compact disk player (2).

The compact disk (CD) player (2) is in electrical communication with a decoder/error correction circuit (5). The compact disk encoding standard of 16 bit digital resolution, a sampling rate of 44.1 KHz, and 20% data overhead for CIRC error detection and correction is preferably used. The use of this standard permits the transmission of the digitized audio portion of CD programs from disk by decoding the compact disk audio program, and then removing the control information via a non-continuous data extractor (55). The "control information" typically includes data that controls the internal circuitry of the compact disk player, such as the modulation, parity, synchronization, merging, and subcode bits. After the control information has been extracted, the data is then re-encoded for transmission. This permits the inclusion of error detection and correction for each receiving station (200). Conversion of the compact disk signal (28) to analog signals is not preferred, because this additional step would add quantization noise, analog procession noise, and nonlinearities that would degrade the quality of the program material.

The decoder/error correction circuit (5) is in electrical communication with a computing compressor (7), such that the decoded digital output signal (29) from the decoder/error corrector (5) is also the input to the computing compressor (7).

The computing compressor (7) compresses the decoded digital output signal (29) from the decoder/error correction circuit (5). This technique of digital data compression is used in the preferred embodiment of the invention because the technique allows the transmission of large volumes of data over a constant data rate medium. By compressing repeating binary ones and zeros out of the decoded digital signal (29) data stream, the output data (30) can be sent at a much higher word rate and in a much shorter period of time.

In order to avoid converting program material from digital CD to analog for processing, the logarithmic processing of CD format is preferably done digitally. A data compression technique similar to that used by the analog signal compressor (4), (described above), is preferably used. That is: The number of required data bits transmitted is reduced by passing the decoded digital signal (29) through logarithmic or exponentially responding digital circuitry which effectively compresses the digitized signal (29).

The compressed digital signal (30) output from the computing compressor (7) passes to the encoder circuit (8). The encoder circuit (8) encodes the digital signal in such a way as to allow correction of the received data at the receiving station (200). The encoded digital signal (31) passes from the encoder circuit (8) to the RF modulator and power amplifier (9).

The modulated RF signal (32), as discussed above, is sent from the RF modulator and power amplifier (9) to a transmitter antenna (10) from which the modulated RF signal is sent over the air to one or more receiving stations (200).

As shown in FIG. 1, a synchronization generator (6) is in communication with, and synchronizes the critical timing of, the decoder/error correction circuit (5), analog signal compressor (4), the computing compressor (7), the encoder circuit (41) (8), and the digitizer (13).

Figure 4:
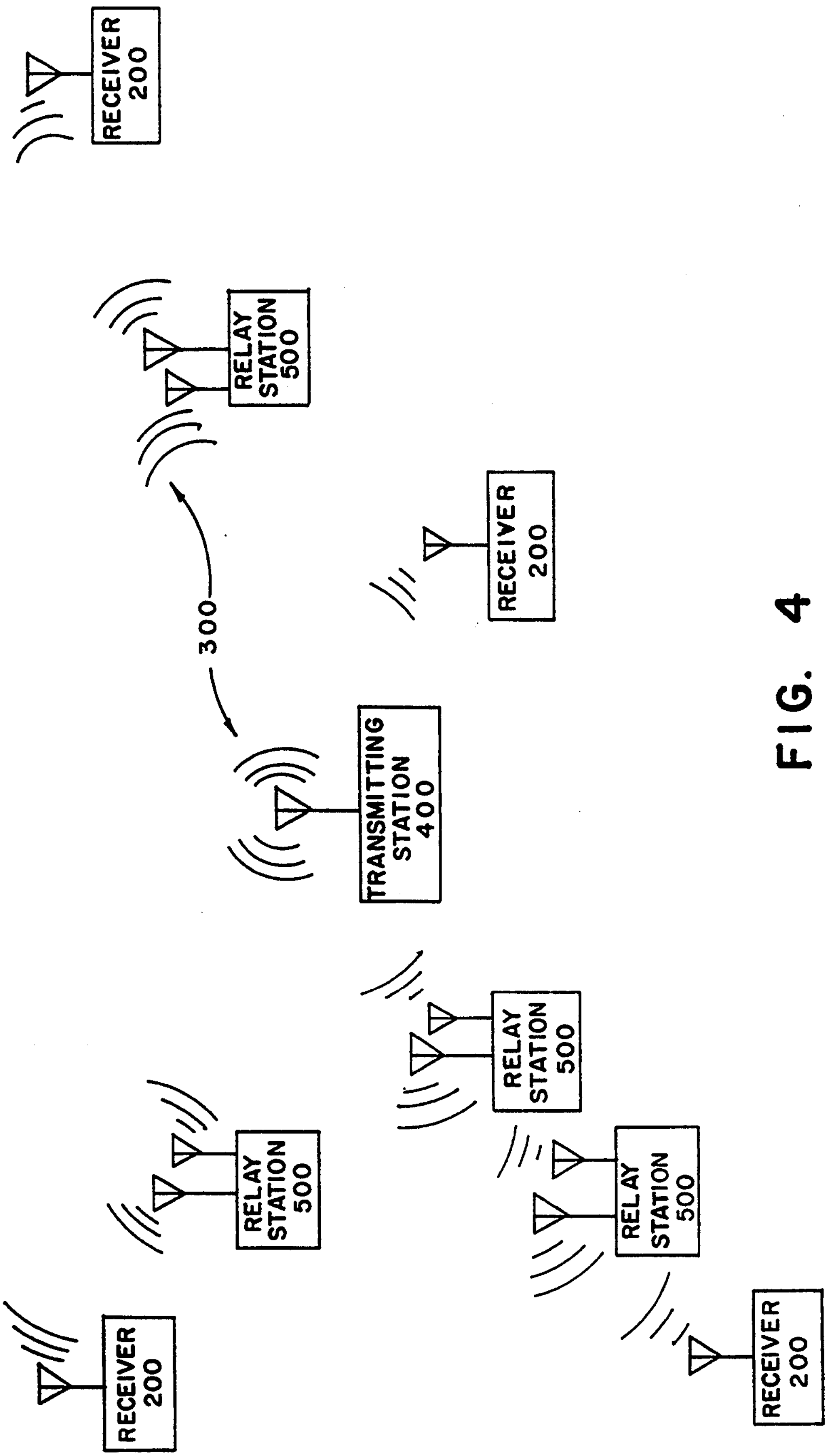
FIG. 4 is a block diagram of showing the general arrangement of the preferred embodiment of the present invention.

In the preferred embodiment of the invention, the RF transmission frequency used is in the upper VHF range to the lower Microwave range (i.e. from 108 MHz to 1 GHz). The use of the VHF band for this system is particularly suitable to "line of sight" transmission-reception distances. By using one or more land or satellite data links, the coverage area for a system of this type using the VHF band can be extended. The present invention is also suitable for data transmission using microwave bands. Although the higher the transmitted carrier frequency, the less the signal is able to propagate in other than line of sight mode, it will be appreciated by those skilled in the art that because the transmitted RF signal (300) of the present invention is carrying digital information, the signal may be relayed from station to station without introducing significant levels of noise to the signal. Accordingly, the preferred embodiment of the present invention comprises a number of intermediate, (land-based and/or satellite), relay stations (500) as shown in FIG. 4.

Figure 8:
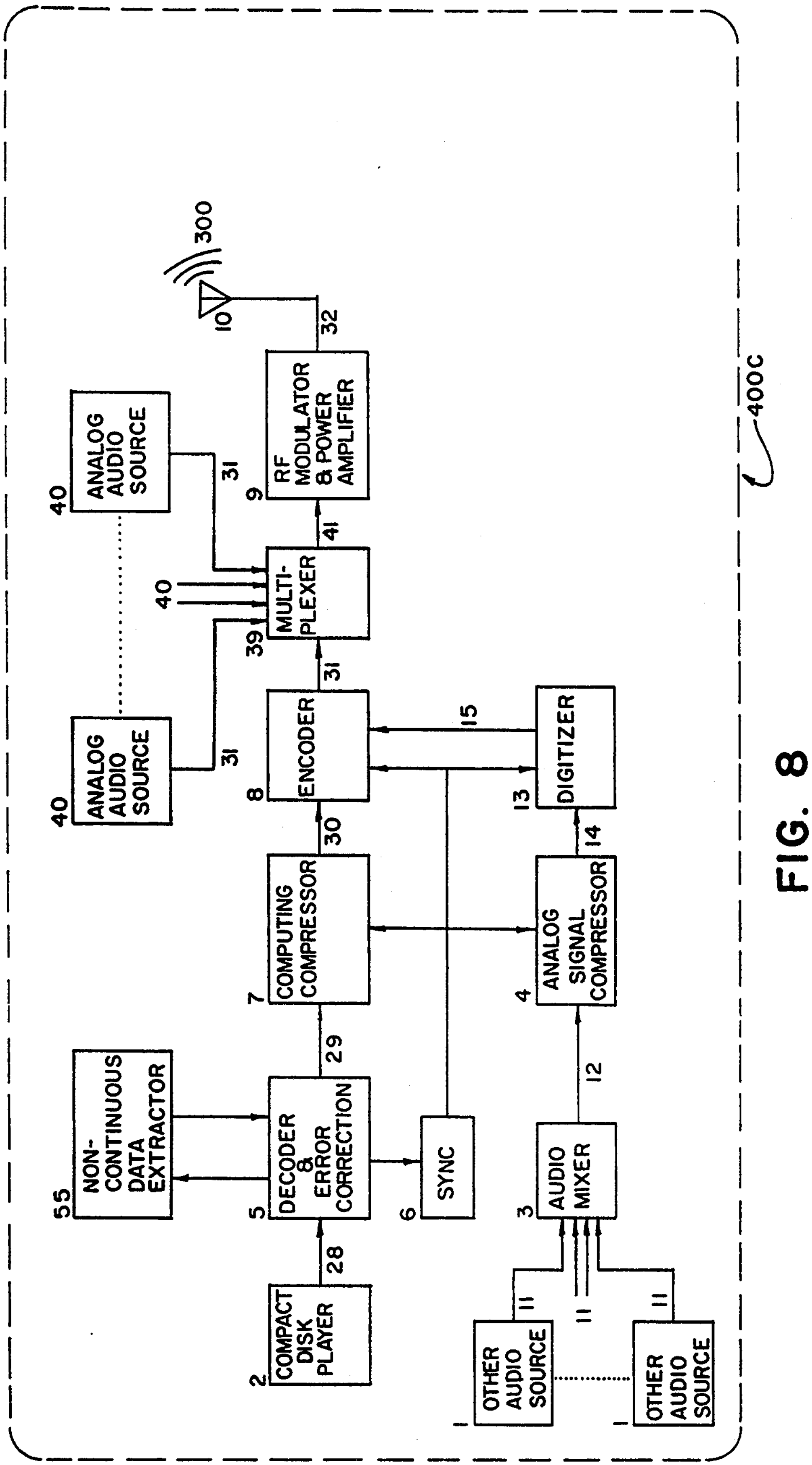
FIG. 8 is a block diagram of a modified transmitting station which comprises a multiplexer and multiple audio sources.

An important modification of the transmitting station (400C) of the present invention is shown in FIG. 8. In this modification of the present invention, instead of the encoded signal (31) passing directly to the RF modulator and power amplifier (9), the encoded signal (31) first passes into a multiplexer (39). As shown in FIG. (8), encoded signals (31) which are generated from a plurality of other digitized sources (40) may also be passed into the multiplexer (39). The multiplexer (39) combines the various encoded digital signals (31) on the same frequency and simultaneously sends the multiplexed signal (41) to the RF modulator and power amplifier (9) for simultaneous transmission of the multiple channels over the same frequency at the same time.

Receiving Station (200)

The receiving station (which is generally designated (200) in the Drawings), receives and decodes the digitial information, and subsequently reconstructs the analog signals to their original form.

Figure 3:
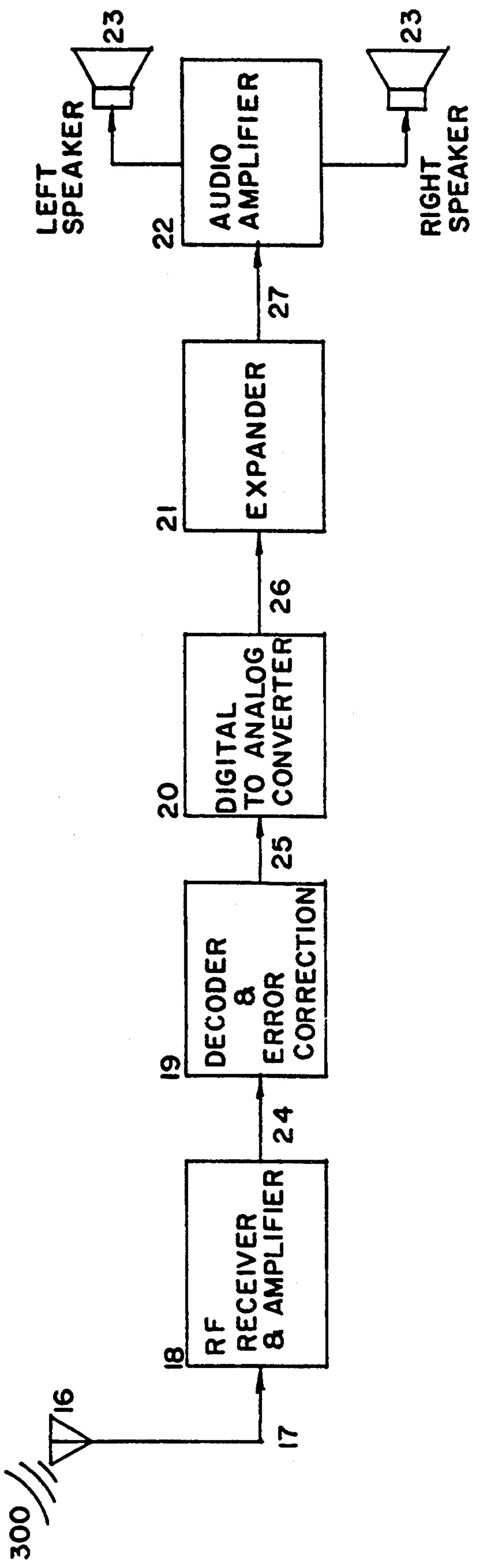
FIG. 3 is a block diagram of the receiving station of a modified embodiment of the present invention.

Referring to FIG. 3, the transmitted RF signal (300) is received by an antenna (16) which is in communication with an RF receiver and amplifier (18) which selects and amplifies the digitally compressed RF modulated signal (17).

The RF receiver and amplifier (18) is in electrical communication with a decoder/error correction circuit (19). The decoder/error correction circuit (19), after analyzing and correcting any errors detected in the digital signal (19), passes the decoded signal (25) to a digital-to-analog (D/A) converter (20). The D/A converter reconstructs the original (compressed) analog signals (26).

The reconstructed analog signals (26) pass from the D/A converter (20) to an analog expander (21). The analog expander (21) reconstructs the original analog signal by logarithmically amplifying the analog signal (26).

The reconstructed original analog signal (27) may then pass from the analog expander (21) to an audio amplifier (22) and speakers (23), (as shown in FIG. 3), thus providing an audio reconstruction of the original audio source (1) and/or the original compact disk source (2).

Figure 2:
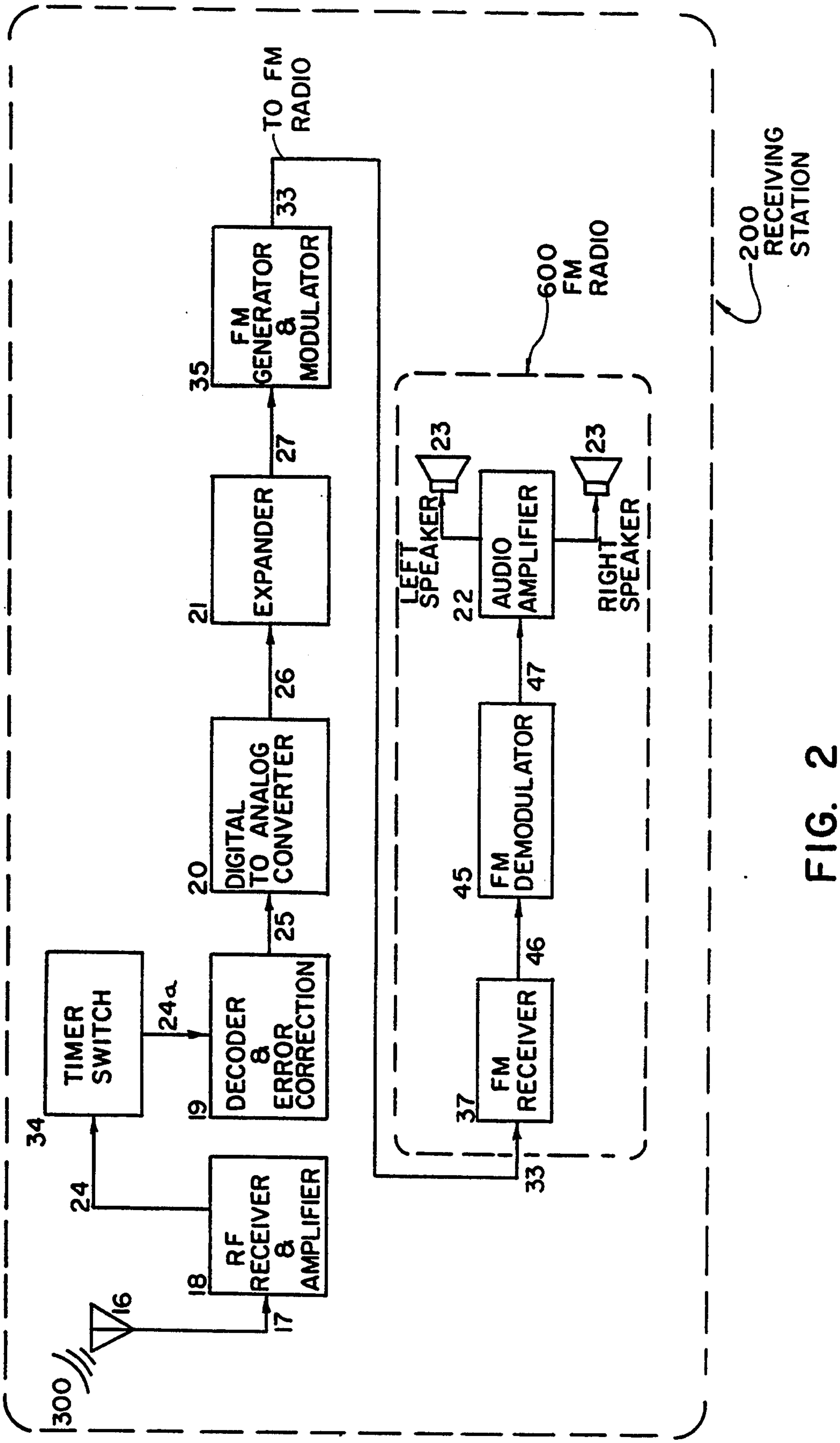
FIG. 2 is a block diagram of the receiving station of the preferred embodiment of the present invention.

However, as shown in FIG. 2, in the preferred embodiment of the invention the expanded analog signal (27) passes from the analog expander (21) to an FM generator and modulator (35).

Referring to FIG. 2: The FM generator and modulator (35) sends an (analog) FM signal (33), (88 MHz to 108 MHz) to an FM receiver (37). In the preferred embodiment of the invention, the transmitting line (33) is an electrically conductive cable which directly couples the FM generator and modulator (35) to an FM receiver (37). The FM receiver (37) is in communication with an FM demodulator (45) which, in turn, is in communication with an audio amplifier (22) and speaker(s) (23) which reproduce the original sounds of the audio source (1) and/or the compact disk source (2).

In the preferred embodiment of the invention a timer switch (34) is in series with the receiving antenna (16) and the transmitting line (33), such that the decoding of the FM signal (33) is discontinued when the timer switch (34) is open.

In the preferred embodiment of the invention, a signal light is in communication with the timer switch, and indicates when the time on the timer switch (34) is about to run out.

Figure 9:
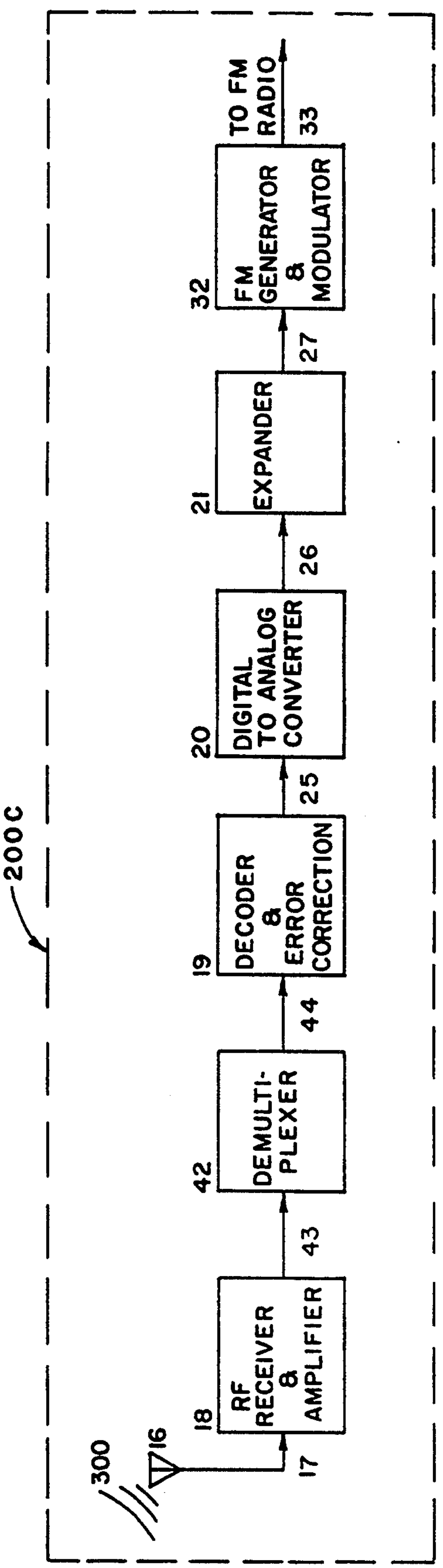
FIG. 9 is a block diagram of a modified receiving station which comprises a de-multiplexer.

An important modification of the receiving station (200C) of the present invention is shown in FIG. 9. In this modification of the present invention, the RF receiver and amplifier (18) is in electrical communication with a demultiplexer (42) which selects a particular sub-carrier frequency from the received and amplified multiplex signal (43). This demultiplexed signal (44) is then sent to the decoder and error correction circuit (19).

It will be appreciated by those skilled in the art that the invention thus described discloses a unique broadcasting system wherein audio sounds (such as voice and music) can be faithfully reproduced (i.e. without introducing human-perceptible noise) by an FM radio (600)—(i.e. FM receiver (37), FM demodulator (45), amplifier (22) and speaker(s) (23))—whose distance from the source of those sounds is beyond the range (i.e. "line-of-sight") of prior FM radio transmissions.

It will also be appreciated by those skilled in the art that by opening the timer switch (34), the FM radio portion (600)—(i.e. FM receiver (37), FM demodulator (45), amplifier (22) and speaker(s) (23))—of the present invention would continue to operate as common FM radio, but would (temporarily) be unable to receive modulated signals originating from outside of the range (i.e. "line-of-sight") of FM radio wave transmissions. Accordingly, it will be appreciated by those skilled in the art that the invention herein described is uniquely adaptable for "subscriber" radio service, wherein at least a portion of the radio's programming input is supplied through an electrically conducting "cable" (33) which is in communication with an FM modulator (35).

Figure 5:
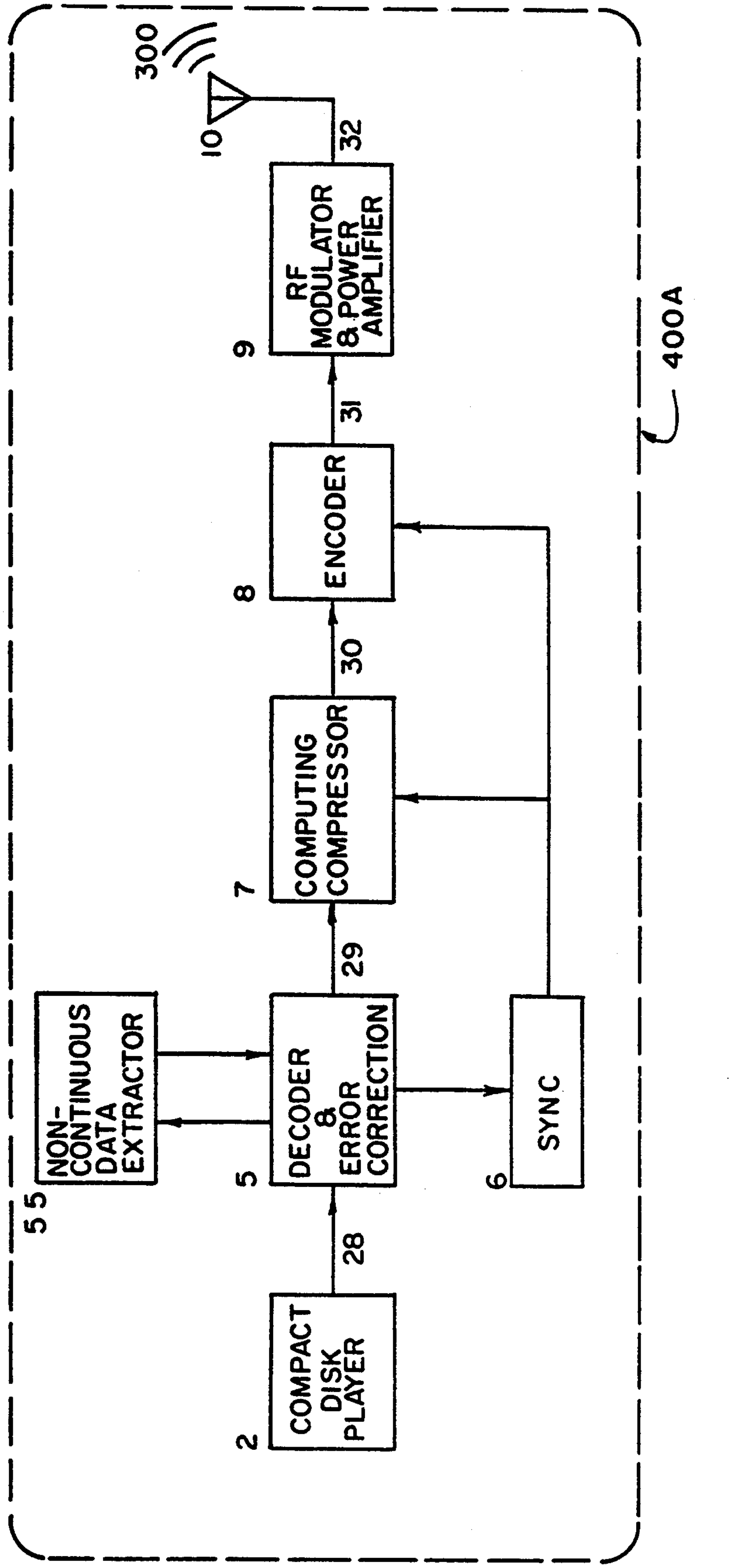
FIG. 5 is a block diagram showing a modification of the present invention which is adapted to receive an input only from a compact disc player.
Figure 6:
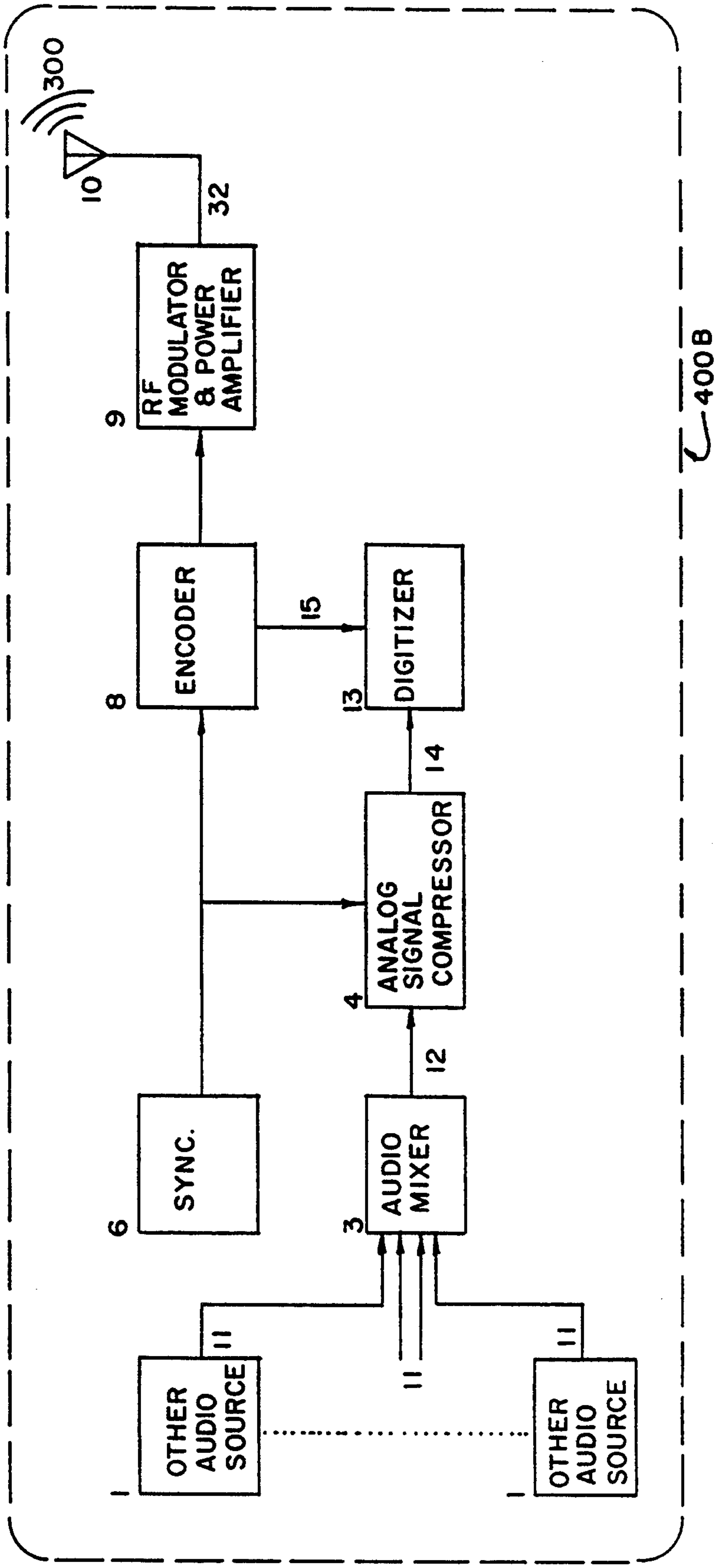
FIG. 6 is a block diagram showing a modification of the present invention which is adapted to receive inputs only from analog audio sources.
Figure 7:
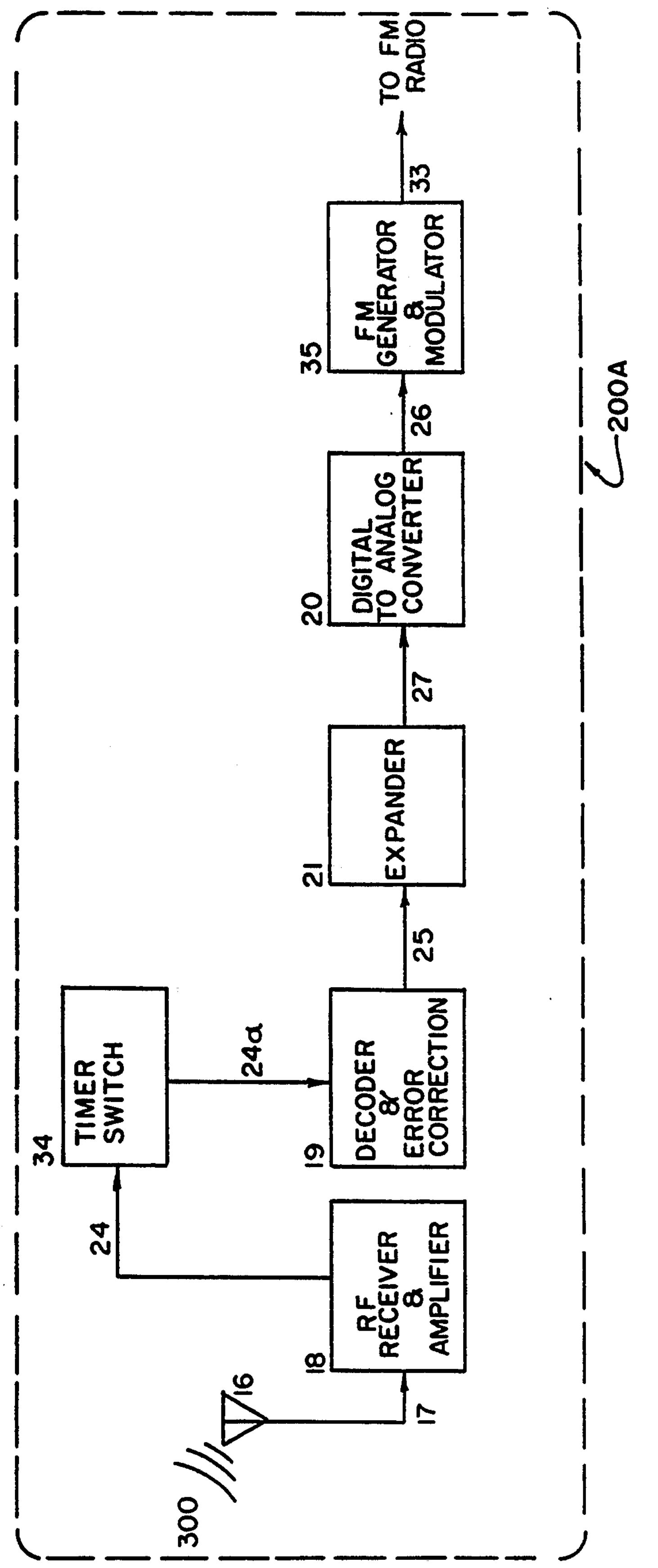
FIG. 7 is a block diagram showing a modified receiving station in which the digital signal is expanded prior to its conversion to an analog signal.

While the above description contains many specificities, these should not be construed as limitations on the scope of the invention, but rather as an exemplification of one preferred embodiment thereof. Many other variations are possible, for example:

A modified transmitting station (400A) may be configured as shown in FIG. 5 which is only adapted to accept input from a compact disk player (2)—(i.e. it is not adapted to accept input from analog audio sources such as microphones, tape player, phonograph records, etc.);

A modified transmitting station (400B) may be configured as shown in FIG. 6 which is only adapted to accept input from analog audio sources (1) such as microphones, tape players, phonographs, etc.—(i.e. it is not adapted to accept input form a compact disk player);

The receiving station (200A) may be modified as shown in FIG. 7 such that data from the decoded signal (25) is input into a digital expander (21), then subsequently converted by a D/A converter (20), before passing to the FM generator and modulator (32);

The timer switch (34) may be in communication with any component of the receving station (200) which, when the time on the timer runs out, would cause transmission of intelligible information from the FM modulator (35) to be interrupted;

The signal light may be replaced with any common indicating device;

The signal light may be omitted;

The multiplexer (39) may receive signals derived from analog audio sources (1) and/or compact disk players (2);

The multiplexer (39) may be omitted; and,

The timer switch (34) may be omitted.

Accordingly, the scope of the invention should be determined not by the embodiment illustrated, but by the appended claims and their legal equivalents.

We claim:

1. A digital audio broadcasting system comprising:
a first digital signal; (28)
means for decoding said first digital signal; (5)
a second digital signal being generated by said means for decoding said first digital signal;
means for electronically extracting non-continuous data from said second digital signal; (55)
a third digital signal being generated by said means for electronically extracting said non-continuous data;
means for generating a first modulated signal from said third digital signal; (9)
a first modulated signal being generated by said means for generating a first modulated signal from said third digital signal; (32)
and means for transmitting said first modulated signal over radio frequency (10).

2. The invention according to claim 1, further comprising:
means for receiving said first modulated signal from said transmitting means; (16)
means for converting said first modulated signal to a fourth digital signal; (18)
means for converting said fourth digital signal to a first analog signal; (20)
means for frequency modulating said first analog signal; (35)
and means for sending said frequency modulated signal to a frequency modulation (FM) receiver.

3. A digital audio broadcasting system comprising:
a first analog audio signal; (12)
a first digital signal; (28)
means for generating a second digital signal from said first analog audio signal; (13)
means for decoding said first digital signal; (5)
means, in communication with said means for decoding said first digital signal, for electronically extracting non-continuous data from said first digital signal; (55)
a third digital signal being generated by said means for decoding said first digital signal;
synchronization generator means in communication with said means for decoding said first digital signal, and with said means for electronically extracting non-continuous data, and with said means for generating a second digital signal; (6)

means for generating a first modulated signal from said second digital signal and said third digital signal; (9)

a first modulated signal being generated by said means for generating a first modulated signal from said second digital signal and said third digital signal; (32)

and means for transmitting said first modulated signal over radio frequency (10).

4. The invention according to claim 3, further comprising:

means for receiving said first modulated signal from said transmitting means; (16)

means for converting said first modulated signal to a fourth digital signal; (18)

means for converting said fourth digital signal to a second analog signal; (20)

means for frequency modulating said second analog signal; (32)

and means for sending said frequency modulated signal to a frequency modulation (FM) (33).

5. A digital audio broadcasting system comprising:

a first analog audio signal; (12)

means for generating a first digital signal from said first analog audio signal; (13)

means, in series with said means for generating said first digital signal, for generating a first modulated signal; (9)

and means for transmitting said first modulated signal over radio frequency airwaves; (10)

means for receiving said first modulated signal from said transmitting means; (16)

means for converting said first modulated signal received from said transmitting means to a second digital signal, said second digital signal being equivalent to said first digital signal; (18)

means for converting said second digital signal to a second analog signal; (20)

means for frequency modulating said second analog signal; (35)

and means for sending said frequency modulated signal to a frequency modulating (FM) (33).

* * * * *